United States Patent Office 2,952,594
Patented Sept. 13, 1960

2,952,594
LATENT-FOAMING VINYL AROMATIC POLYMER COMPOSITIONS AND METHOD OF MAKING THE SAME

Louis C. Rubens, Midland, Mich., assignor to The Dow Chemical Company, Midland, Mich., a corporation of Delaware No Drawing. Filed Feb. 25, 1957, Ser. No. 641,796

9 Claims. (Cl. 204—154)

This invention concerns a method of making cellular articles or bodies having superior heat distortion properties from thermoplastic vinyl aromatic polymers and pertains especially to improvements in latent-foaming polymer compositions and a process for making latent-foaming vinyl aromatic polymer compositions suitable for making cellular bodies or masses having superior heat distortion properties.

U.S. Patent No. 2,531,665 makes expanded polystyrene by impregnating a sheet of polystyrene with a gas such as air, nitrogen, or carbon dioxide under pressure at elevated temperatures, cooling of the impregnated polystyrene until rigid while maintaining the pressure, then releasing the pressure, and heating the rigid polystyrene containing the dissolved gas to the plastic state under conditions which prevent any substantial expansion of the material from the absorbed gas and which prevents any cell formation during the heating up, and, when the material is plastic throughout, suddenly releasing the pressure and rapidly cooling the expanded product.

U.S. Patent No. 2,681,321 makes cellular polystyrene by mixing a volatile organic liquid, e.g. pentane, hexane, heptane, petroleum ether, etc., in which polystyrene is insoluble, with monomeric styrene or a solution of polystyrene in monomeric styrene, heating of the mixture to polymerize the monomer at temperature below the boiling point of the volatile liquid under the conditions employed to form a polymerization product which is a solid body containing the volatile liquid dispersed throughout, and heating the resulting mass at temperatures above the softening point of the polymer and above the boiling point of the volatile liquid, whereby vapors of the liquid expand the softened polymer to form a porous mass.

The solid polystyrene bodies containing the absorbed gas or volatile organic liquid dispersed throughout, prepared by the aforementioned known methods, are latent-foaming polymer compositions, because upon heating the solid masses under suitable conditions to the softening point of the polymer or above, the volatile substances dispersed therein expand the polymer to form porous or cellular masses.

However, the methods have certain disadvantages as mentioned in the patents. For example, when the polymer is impregnated with a gas such as carbon dioxide, it is desirable to hold the material under pressure while it is being heated to the plastic state to prevent appreciable diffusion of the gas from the polymer during the heating up. If such precaution is not observed, the pressure of the residual gas may be insufficient to cause the desired expansion. When the composition is polystyrene having a volatile organic liquid, e.g. pentane, hexane, etc., dispersed throughout it is required that the mass be heated to only a few degrees above the softening point of the polystyrene in order to obtain a satisfactory porous mass.

In preparing cellular or foamed bodies from latent-foaming polymer compositions, e.g. polystyrene containing a volatile organic compound in which the polystyrene is insoluble dispersed throughout, it has been observed that the foamed mass obtained upon heating the composition to temperatures above the softening point of the polymer has a tendency to shrink rapidly or may even collapse to a non-porous or non-uniformly porous mass unless the foamed product is rapidly cooled to a temperature at which it becomes rigid. The higher the temperature above the softening point of the polymer the greater is the tendency of the foamed mass to shrink or collapse. Because of the good insulating properties of the foamed product, cooling of outer surfaces of the mass results in an outer rigid layer of insulating foam which effectively prevents rapid cooling of interior portions of the mass and may result in a foam of non-uniform cell structure.

It is a principal object of the invention to provide a method of overcoming the aforementioned difficulties in making cellular articles from latent-foaming polymeric compositions. Another object is to provide a method of making cellular masses having superior heat distortion properties from vinyl aromatic polymers. Still another object is to provide a method of making latent-foaming vinyl aromatic polymer compositions suitable for making foamed polymer masses having a high resistance to distortion, particularly shrinking, upon exposure to heat at temperatures above the softening point of the polymer. A further object is to provide a method of treating vinyl aromatic polymers or latent-foaming vinyl aromatic polymer compositions which results in an increase in the heat distortion properties of cellular masses prepared therefrom. Still another object is to prepare improved latent-foaming vinyl aromatic polymer compositions. Other and related objects will appear from the following description of the invention.

According to the invention cellular masses or bodies of foamed vinyl aromatic polymers prepared from latent-foaming polymer compositions, which foams have superior resistance to shrinking upon exposure to heat, can readily be obtained by subjecting the polymer to ionizing radiation prior to expanding or to foaming the polymer. The polymer is subjected to ionizing radiation in amount sufficient to cause an increase in the resistance of the polymer to the action of organic solvents and insufficient to prevent substantial expansion of the polymer by vapors of a volatile non-solvent foaming agent at a temperature above the softening point of the polymer, e.g. a temperature of 100° C. or above.

Ionizing radiation as the term is well understood in the art concerns the exposure of a material and especially a normally solid polymer such as a thermoplastic vinyl aromatic polymer or a latent-foaming polymer composition consisting essentially of a solid thermoplastic vinyl aromatic polymer containing a volatile organic compound absorbed or dispersed throughout as foaming agent, to the action of ionizing radiations such as beta-rays, gamma-rays, accelerated electrons, neutrons, heavy particles, X-rays, etc. Convenient sources for such radiation may be furnished by atomic piles, electron accelerators, radioactive isotopes or X-ray equipment, e.g. cobalt 60 or a Van de Graaff accelerator.

The thermoplastic vinyl aromatic polymers to be employed in the invention are normally solid polymers of one or more monovinyl aromatic hydrocarbons such as styrene, vinyltoluene, vinylxylene, ethylvinylbenzene, isopropylstyrene, or tertiary-butylstyrene or copolymers of any two or more of such monovinyl aromatic hydrocarbons. The thermoplastic vinyl aromatic polymers contain at least 70 percent by weight of one or more monovinyl aromatic hydrocarbons, preferably styrene, copolymerized with not more than 30 percent by weight of a monoethylenically unsaturated vinyl or vinylidene compound such as acrylonitrile, methyl methacrylate or alpha-methyl styrene.

Latent-foaming polymer compositions can be prepared by impregnating the solid polymers in the forms of rods, bars, sheet, logs, billets, granules, or beads, with a gas such as carbon dioxide, ethylene, propylene, dichlorodifluoromethane, monochlorodifluoromethane, sym-dichlorotetrafluoroethane, etc., under pressure and at a temperature within the range of from about 25° to 125° C., and cooling of the polymer until rigid, e.g. to a temperature of 40° C. or below, prior to releasing the pressure.

In an alternate procedure latent-foaming polymer compositions can be prepared by procedure disclosed in U.S. Patent No. 2,681,321, wherein a volatile organic liquid such as pentane, hexane, heptane, petroleum ether, etc., is mixed with monomeric styrene or a solution of polystyrene dissolved in styrene and the mixture is polymerized at temperatures below the boiling point of the volatile liquid under the conditions employed to form a solid body containing the volatile liquid dispersed throughout.

In practice of the invention, the solid polymer prior to, or after, its being impregnated with a gas or the solid polymer containing a volatile organic liquid, e.g. pentane, dispersed throughout, as foaming agent is subjected to ionizing radiation in amount sufficient to bring about an increase in the resistance of the polymer to the action of organic solvents and insufficient to prevent substantial expansion of the polymer by vapors of the foaming agent at temperatures above the softening point of the polymer. The dose of ionizing radiation required to effect an increase in the resistance to shrinkage of foamed masses prepared from the latent-foaming polymer compositions will vary over a wide range, depending in part upon the vinyl aromatic polymer employed. For example, polystyrene requires a substantial dose of ionizing radiation to increase its resistance to the action of organic solvents, whereas vinyl aromatic polymers such as polyvinyltoluene or polyvinylxylene have their resistance to the action of organic solvents increased at appreciably lower dosages of ionizing radiation. In general, a dosage of from 2 to 300, preferably from 5 to 300, megareps is satisfactory. The polymer or polymeric latent-foaming composition should not be irradiated to the point where it becomes non-swellable in toluene. A satisfactory test is to subject the vinyl aromatic polymer to ionizing radiations sufficient to cause an increase in the viscosity of a 10 weight percent solution of the polymer in toluene, preferably such that the irradiated polymer is insoluble but swells appreciably, e.g. to from 2 to 40 times or more its initial volume or more, in toluene at 25° C.

It may be mentioned that in carrying out the irradiation of the latent-foaming polymer compositions, i.e. the polymer containing the volatile organic compound or blowing agent dispersed throughout, at high energy levels such as occurs with accelerated electrons from a Van de Graaff accelerator, the irradiation is preferably carried out intermittently or with cooling of the polymeric material, in order to avoid the building up of heat within the polymer which may result in foaming of the material during irradiation.

The latent-foaming polymer compositions can be foamed or expanded in usual ways, e.g. by heating the material to a temperature above the softening point of the polymer and above the boiling point of the volatile organic compound. Such heating may take place in a mold, in the atmosphere or in a heated oven. For example, a mold having vents for escape of gas may be partially filled with granules of the irradiated latent-foaming vinyl aromatic composition, then closed and heated to a temperature sufficient to cause expansion of the polymer granules against one another and against walls of the mold, thereby causing the expanded polymer to flow together to form a unitary article. The irradiated polymer compositions can be foamed or expanded at temperatures substantially above the heat distortion temperature of the polymer and form cellular masses or bodies which are highly resistant to distortion, particularly shrinkage, upon exposure to heat at elevated temperatures.

The following examples illustrate ways in which the principle of the invention has been applied, but are not to be construed as limiting its scope.

EXAMPLE 1

A charge of 87 percent by weight of styrene and 13 percent of dichlorodifluoromethane, together with 0.5 percent by weight of benzoyl peroxide as catalyst, was sealed in a glass ampoule and polymerized by heating the same at a temperature of 80° C. for 7 days. Thereafter, the ampoule was cooled, broken, and the polymeric product removed. The product was a solid body containing the dichlorodifluoromethane dispersed throughout. The solid product was cut to granules having sizes of about ¼ inch. Portions of the granules were subjected to irradiation with electrons from a Van de Graaff accelerator for dosages of 2, 5, and 10 megareps, respectively. Thereafter, the irradiated polymer granules were immersed in a silicon oil bath maintained at a temperature of 130° C. wherein the polymer was foamed. The time in seconds for the polymer to expand to its maximum foam volume expressed as the volume of the foam divided by the volume of the initial test piece was observed, then while maintaining the foam in the oil bath, the time required for the foamed polymer to shrink to a volume one-half that of the maximum volume was observed. This is herein called the "half-life" of the foam. The half-life is a measure of the stability or resistance to shrinkage of the foam at the test temperature. The greater the half-life the greater is the stability of the more resistant is the foam shrinkage. For purpose of comparison, a portion of the polymer composition which was not subjected to irradiation was foamed in similar manner and the results reported in the following Table I. The table gives the total radiation dosage, the maximum foam volume and the half-life or time in minutes for the foam to shrink to a volume of one-half as great as the maximum foam volume.

*Table I*

| Run No. | Radiation dosage, megareps | Foam volume Initial volume | Time to shrink to ½ max. vol., minutes |
|---|---|---|---|
| 1 | 0 | 15 | 2 |
| 2 | 2 | 17 | 2 |
| 3 | 5 | 13 | 3 |
| 4 | 10 | 35 | 45 |

EXAMPLE 2

A charge of 87 percent by weight of vinyltoluene and 13 percent of dichlorodifluoromethane, together with 0.5 percent of benzoyl peroxide as polymerization catalyst, was sealed in a glass ampoule and polymerized to form a solid body containing the dichlorodifluoromethane dispersed throughout, employing procedure similar to that employed in Example 1. The solid polymeric product was cut to ¼-inch granules and was irradiated with accelerated electrons and tested, employing procedures similar to those employed in the preceding example. Table II gives the total radiation dosage, the maximum foam volume expressed as the volume of the foam divided by the initial volume of the test piece and the time in minutes for the foam to shrink to a volume of one-half as great as the maximum foam volume.

Table II

| Run No. | Radiation dosage, megareps | Foam volume / Initial volume | Time to shrink to ½ max. vol., minutes |
|---|---|---|---|
| 1 | 0 | 11 | 1 |
| 2 | 2 | 14 | 2 |
| 3 | 5 | 20 | 4 |
| 4 | 10 | 32 | 42 |

EXAMPLE 3

Polystyrene having a viscosity characteristic of 22 centipoises determined for a 10 weight percent solution of the polystyrene in toluene at 25° C. was heat-plastified and extruded in the form of ⅛-inch diameter rods which were cooled and cut to granules ¼-inch long. Portions of the granules were subjected to ionizing radiation with accelerated electrons from a Van de Graaff machine for dosages of 10 and 100 megareps, respectively. Thereafter, the irradiated polymer was placed in a stainless steel bomb and subjected to 1000 pounds per square inch gauge pressure of carbon dioxide at room temperature for a period of 48 hours. The pressure was released and the polymer removed from the bomb. The polystyrene was found to contain from 8 to 8.5 percent by weight of carbon dioxide dissolved in the polymer granules. The polymeric composition was foamed and tested employing procedure similar to that employed in Example 1. The results obtained are reported in Table III.

Table III

| Run No. | Radiation dosage, megareps | Foam volume / Initial volume | | Time to shrink to ½ max. vol. at temp. of— | |
|---|---|---|---|---|---|
| | | 115° C. | 130° C. | 115° C. | 130° C. |
| 1 | 0 | 35 | 22 | 2 | <1 |
| 2 | 10 | 33 | 22 | 3 | <1 |
| 3 | 100 | 21 | 28 | 13 | 12 |

In Table III the polystyrene irradiated with a dosage of 10 megareps was soluble in toluene. The polystyrene irradiated with a dose of 100 megareps was insoluble in toluene, but swelled in said solvent to a volume 49 times as great as its initial volume.

EXAMPLE 4

The procedure of Example 3 was repeated employing polyvinyltoluene in the experiments. The following results were obtained.

Table IV

| Run No. | Radiation dosage, megareps | Foam volume / Initial volume | | Time to shrink to ½ max. vol. at temp. of— | |
|---|---|---|---|---|---|
| | | 115° C. | 130° C. | 115° C. | 130° C. |
| 1 | 0 | 27 | 33 | 2.5 | 1 |
| 2 | 10 | 20 | 30 | 4 | 1 |
| 3 | 100 | 24 | 31 | 48 | 25 |

The polyvinyltoluene irradiated with a dose of 10 megareps of ionizing radiation was soluble in toluene. The polyvinyltoluene irradiated with a dose of 100 megareps was insoluble in toluene, but swelled in said solvent to a volume 12 times as great as the initial volume of a test piece.

I claim:

1. In a process for making a cellular vinyl aromatic polymer body wherein a latent-foaming polymer composition consisting essentially of a solid thermoplastic vinyl aromatic polymer consisting of at least 70 percent by weight of a monovinyl aromatic hydrocarbon chemically combined in the polymer molecule and having a volatile organic compound boiling at temperatures below 100° C. at 760 millimeters absolute pressure uniformly dispersed throughout is expanded to form a cellular mass by heating the solid composition to a temperature above the softening point of the polymer and above the boiling point of the volatile organic compound contained therein, the improvement which consists in subjecting the polymer to ionizing radiation in amount corresponding to a total dosage of from 2 to 300 megareps prior to expanding the same by heating the polymeric composition.

2. A process as claimed in claim 1, wherein the vinyl aromatic polymer is polystyrene.

3. A process as claimed in claim 1, wherein the vinyl aromatic polymer is polyvinyltoluene.

4. A process as claimed in claim 1, wherein the ionizing radiation is accelerated electrons.

5. A process as claimed in claim 1, wherein the vinyl aromatic polymer is subjected to ionizing radiation for a total dosage of from 5 to 300 megareps.

6. A latent-foaming polymer composition consisting essentially of a solid thermoplastic vinyl aromatic polymer consisting of at least 70 percent by weight of a monovinyl aromatic hydrocarbon chemically combined in the polymer molecule and containing a volatile organic compound which is a non-solvent for the polymer and boiling at a temperature below 100° C. at 760 millimeters absolute pressure dispersed throughout, said polymer having been subjected to ionizing radiations in amount corresponding to a total dosage of from 2 to 300 megareps and said composition being capable of being expanded to form a cellular polymer body having a volumes at least as great as five times the initial volume of the solid polymeric composition.

7. A latent-foaming polymer composition as claimed in claim 6, wherein the vinyl aromatic polymer is polystyrene.

8. A latent-foaming polymer composition as claimed in claim 6, wherein the vinyl aromatic polymer is polyvinyltoluene.

9. A latent-foaming polymer composition as claimed in claim 7, wherein the polystyrene is subjected to ionizing radiation for a total dosage of from 5 to 300 megareps.

References Cited in the file of this patent

UNITED STATES PATENTS 2,797,443    Carlson _____ July 2, 1957

FOREIGN PATENTS 730,476    Great Britain _____ May 25, 1955

OTHER REFERENCES

"Radiation Applications," March 1955, published by Radiation Applications Inc.

I & E Chem., vol. 45, September 1953, pp. 11A and 13A.